(12) United States Patent
Ezaki et al.

(10) Patent No.: US 6,682,517 B1
(45) Date of Patent: Jan. 27, 2004

(54) PLURAL COMPARTMENT MEDICAL CONTAINER

(75) Inventors: Tomohiko Ezaki, Kawasaki (JP); Isao Ohtake, Kawasaki (JP); Hitoshi Saitoh, Kawasaki (JP); Akihiko Sakata, Kawasaki (JP); Takayuki Mizuo, Kawasaki (JP)

(73) Assignees: Showa Denko K.K., Tokyo (JP); Showa Denko Plastic Products Co., Ltd., Tokyo (JP)

( * ) Notice: Subject to any disclaimer, the term of this patent is extended or adjusted under 35 U.S.C. 154(b) by 0 days.

(21) Appl. No.: 09/674,642

(22) PCT Filed: Mar. 2, 1999

(86) PCT No.: PCT/JP99/00992
§ 371 (c)(1),
(2), (4) Date: Nov. 2, 2000

(87) PCT Pub. No.: WO00/51544
PCT Pub. Date: Sep. 8, 2000

(51) Int. Cl.[7] ............................... A61B 19/00
(52) U.S. Cl. ................. 604/410; 604/408; 604/403
(58) Field of Search ............. 604/403, 408–411, 604/95; 220/62.22; 206/363–366; 383/210.1

(56) References Cited

U.S. PATENT DOCUMENTS 5,509,898 A * 4/1996 Isono et al. .......... 128/DIG. 24
5,695,840 A * 12/1997 Mueller .................... 428/35.7
5,698,317 A 12/1997 Kurokawa et al.
6,007,529 A * 12/1999 Gustafsson et al. ......... 206/219
6,319,243 B1 * 11/2001 Becker et al. .............. 206/221

FOREIGN PATENT DOCUMENTS

| JP | 2-4671 | 1/1990 | |
| JP | 7-299117 | 11/1995 | ............. A61J/1/05 |
| JP | 8-229101 | 9/1996 | |
| JP | 9-56778 | 3/1997 | ............. A61J/1/05 |
| TW | 303297 | 4/1997 | |

* cited by examiner

Primary Examiner—Angela D. Sykes
Assistant Examiner—Leslie R Deak
(74) Attorney, Agent, or Firm—Sughrue Mion, PLLC

(57) ABSTRACT

A plural-compartment medical container, wherein said container is a pouch formed of a synthetic resin and has an open member at least one end of upper and lower ends thereof for filling or withdrawing a drug solution, and the inner surface of said container is divided into plural compartments in a liquid-tight manner by a blocking seal portion, characterized in that when a melting temperature curve of a resin of said blocking seal portion is determined using differential scanning calorimeter, a height ratio (h2/h1) between a height (h1) of a peak at a temperature of main melting peak and a height (h2) of said temperature curve at a temperature of 115° C., is within a range of 0.05 to 0.4, the blocking seal portion thereof peeling well by pushing operation to the pouch, provides a plural-compartment medical container having excellent flexibility and transparency.

5 Claims, 2 Drawing Sheets

PLURAL COMPARTMENT MEDICAL CONTAINER

TECHNICAL FIELD

The present invention relates to a plural-compartment medical container, the container having plural compartments capable of carrying plural drug solutions or infusion solutions separately and mixing the drug solutions by communicating the compartments just before use.

BACKGROUND ART

When plural drug solutions or infusion solutions containing unstable drugs are mixed in advance, the solutions sometimes cause change with the passage of time, such as discoloration or deterioration. For such solutions, the solutions are carried in a container divided into plural compartments, and mixed by opening the partition at the time of use in methods. As examples thereof, the method can be mentioned wherein a container is formed from a film of a resin composition of a mixture of resins having different melting points, and a peelable seal portion is formed by heat-sealing a portion in a belt shape, which is to be a seal portion (partition portion), at a temperature between low melting point resin and high melting point resin.

Specifically, a plural-compartment container in which a film of mixed resin of polypropylene and polyethylene (Japanese Unexamined Patent Application, No. Hei 2-4671), or a film of mixed resin of liner polyethylene and high density polyethylene having different densities (Japanese Unexamined Patent Application, No. Hei 8-229101) is used, can be mentioned. In these plural-compartment containers, a peeling strength of the partition portion is almost determined depending to a ratio of mixed resins.

However, when the mixed ratio is varied in order to obtain a desired peeling strength, the flexibility and transparency are naturally affected, resulting in the difficulty to obtain products without losing constant properties. In addition, the partition portions sometimes do not peel smoothly when they are opened.

DISCLOSURE OF THE INVENTION

The object of the present invention is to provide a plural-compartment medical container, capable of carrying plural drug solutions or infusion solutions in plural compartments without leaking and mixing before use, and capable of communicating the compartments at the time of use, wherein the compartments are certainly communicated by pushing the pouch and the container has excellent flexibility and transparency.

As a result of extensive researches, the present inventors have discovered that it is possible to achieve the above object when a blocking seal formed of a resin having specific thermal properties is employed, and accomplished the present invention.

Namely, the present invention provides a plural-compartment medical container, wherein said container is a pouch formed of a synthetic resin and has an open member at least one end of upper and lower ends thereof for filling or withdrawing a drug solution, and the inner surface of said container is divided into plural compartments in a liquid-tight manner by a blocking seal portion, characterized in that when a melting temperature curve of a resin of said blocking seal portion is determined using differential scanning calorimeter, a height ratio ($h_2/h_1$) between a height ($h_1$) of a peak at a temperature of main melting peak and a height ($h_2$) of said temperature curve at a temperature of 115° C., is Within a range of 0.05 to 0.4.

Figure 1:
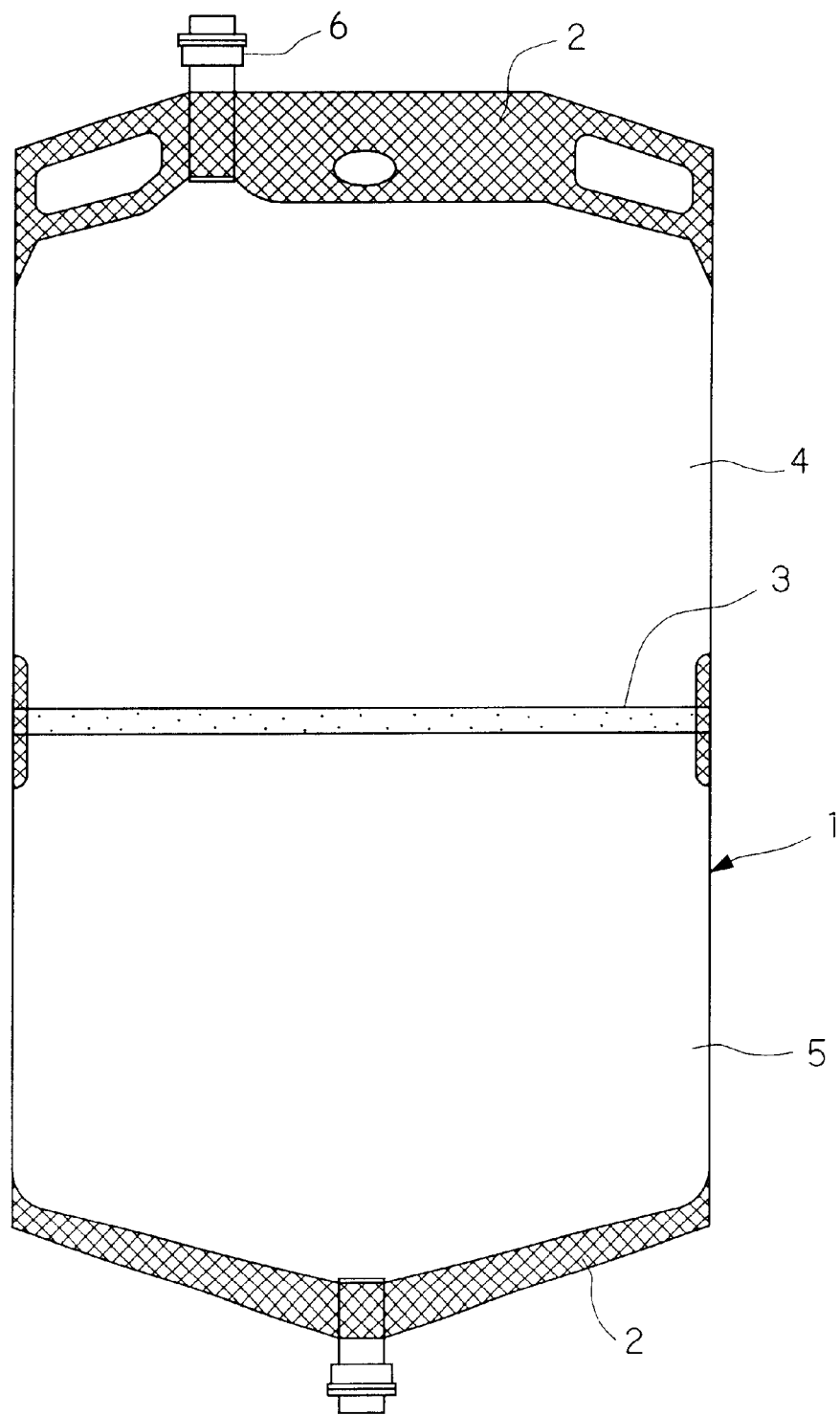
FIG. 1 is a front view showing an example of plural-compartment medical container according to the present invention.

Best Mode for Carrying out the Invention

The present invention will be explained referring to the drawings hereinbelow.

FIG. 1 is a front view showing an example of plural-compartment medical container according to the present invention.

This plural-compartment medical container 1 is a pouch container formed by providing a tubular film of thermoplastic resin with a heat seal portion 2 so that the inner surface of the pouch is divided into plural compartments in a liquid-tight manner by a blocking seal portion 3. The pouch container has at least an open member 6 for filling or withdrawing a drug solution at at least one end of upper and lower ends of the container. Each compartment 4 or 5 is filled with a different drug solution or infusion solution. In addition, when a melting temperature curve (hereinafter referred to as a DSC curve) of a resin of said blocking seal portion is determined using differential scanning calorimeter, a height ratio ($h_2/h_1$) between a height ($h_1$) of a peak at a temperature of main melting peak and a height ($h_2$) of a peak at a temperature of main melting peak and height ($h_2$) of said temperature curve at a temperature of 115° C., is within a range of 0.05 to 0.4.

According to the present invention, a DSC curve refers to a curve obtained by the method according to JIS K7121 (1921).

According to the method, a specimen is subject to the predetermined heat treatment after conditioning, and subsequently the determination of a melting temperature. More specifically, approximately 5 mg of specimen is weighed by a chemical scale, the conditioning is carried out for 24 hours in an atmosphere at a temperature of 23° C. and a relative humidity of 50%. After the conditioning, the specimen is placed in a container for a DSC device, allowed to melt by heating up to a temperature which is about 30° C. higher than the temperature at the end of the melting peak, and maintained at the temperature for 10 minutes. Then, the specimen is cooled at the cooling rate of 10° C./min to a temperature that is at least 50° C. lower than the temperature at transition peak, and maintained at the temperature for 10 minutes. Then, the specimen is again allowed to melt by heating up to a temperature that is about 30° C. higher than the temperature at the end of the melting peak, and a DSC curve is obtained.

Figure 2:
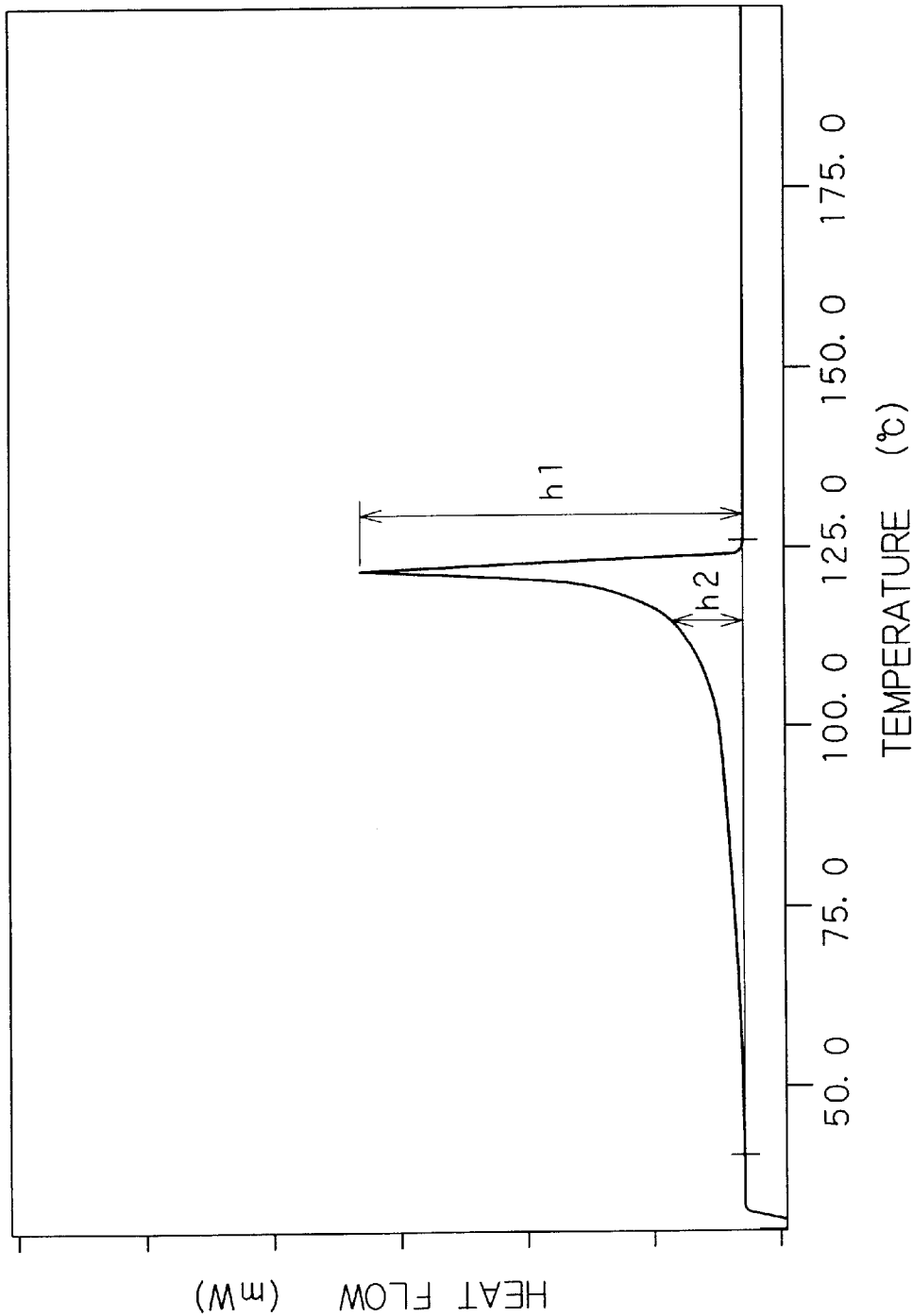
FIG. 2 is an example of DSC curve of a resin used in plural-compartment, medical container according to the present invention.

An example of DSC curve of a resin preferably used in the present invention is shown in FIG. 2.

The height ratio ($h_2/h_1$) described above is preferably 0.1 to 0.35, and more preferably 0.15 to 0.3. If the height ratio is less than 0.05, the opening strength of the blocking seal portion is not sufficient. The height ratio of more than 0.4 is not preferable because it becomes difficult to open the blocking seal portion.

In addition, according to the present invention, the resins used in the blocking seal portion, preferably have Tpm described above within a range of 120 to 135° C. In this case, the container becomes thermally resistant so as to enable sterilization at a temperature of 115° C. or more, and is advantageously used for sterilization at a high temperature. Such resins are superior in thermal resistance for polyolefin resins, and therefore the use thereof is expected to expand.

According to the present invention, it is preferable to use a single resin of polyethylene in the blocking seal portion. Specifically, polyethylene resins such as linear low density polyethylene (LLDPE), high density polyethylene (HDPE) or the like, preferably LLDPE obtained by polymerization using single site catalysis such as metallocene catalysis, can be mentioned. In addition, although the flexibility is lowered, propylene resins such as propylene random copolymers (random PP), wherein a small amount of other α-olefins such as ethylene are copolymerized, can be also used for some uses.

Furthermore, the plural-compartment medical container of the present invention preferably consists of a single layer of resin that satisfies the above requirements. Alternatively, the plural-compartment medical container may have a multilayer structure wherein the inner layer is made of a resin satisfying the above requirements and another resin is laminated on the outer surface of the inner layer. The resins used for the outer layer of the multilayer structure are not limited provided that it does not deterior ate the transparency and flexibility of the medical container. The examples of preferable resins therefor include polypropylenes (homopolypropylene, propylene block copolymers or the like), polyamide resins (polyamide 6, polyamide 66, polyamide 6–66 copolymers or the like) and the like. In order to make a multilayer structure; lamination may be carried out with adhesive resins or adhesive agents by the conventional methods (inflation molding, extrusion-lamination molding, and the like) in the art. Therefore, a single layer film made of resin satisfying the above requirements or a laminated film having an inner layer of resin satisfying the above requirements can be used as a material. The thickness of a resin film that constitutes the container is generally 0.10 to 0.80 mm, preferably 0.15 to 0.70 mm, more preferably 0.15 to 0.50 mm. If the thickness is less than 0.10 mm, the container has a problem for practical use due to its insufficient strength. If the thickness excesses 0.80 mm, the flexibility is decreased and the use thereof is possibly limited.

The blocking seal portion is a semi-welded seal obtained by heat sealing at the temperature lower than Tpm of the resin. A semi-welded seal is in a condition where welded portions and nonwelded portions are mixed in a microstructure. Namely, the blocking seal portion of the container of the present invention necessarily keeps a condition sealed in a liquid tight manner while welded portions and nonwelded portions are mixed in a microstructure. The temperature of blocking seal depends on the used resins or sealing methods. However, it is necessary to determine the sealing temperature to be a temperature lower than melting point of the resin from which the inner surface of the container is made.

When the DSC curve has two or more peaks, it is preferable that a blocking-sealing is carried out at a temperature lower than a temperature of the lowest temperature peak.

The width of the blocking seal portion is more than 2 mm, Preferably 5 to 20 mm.

The blocking seal portions having the above structures are provided with functions which do not peel by such a week power that it usually may act at the time of storage or transportation, but which surely peel by pushing the pouch at the time of use to allow compartments to communicate with each other. The opening strength is preferably 10 to 80 kgf, and more preferably 15 to 60 kgf. If the opening strength is less than 10 kgf, it may open at the time of storage or transportation by mistake. If the opening strength exceeds 80 kgf, it is difficult to be opened by weak people.

In addition, As peeling properties of opening, it is preferable that the whole blocking seal portion peels without stopping, or that the whole blocking seal portion peels by pumping operation for mixing drug solutions contained therein after opening. If an unpeeled portion remains in the container, it is disadvantageous at time of use and therefore not preferable.

The medical container of the present invention needs to have transparency which makes sure whether or not the undesired object is present in the contained drug solution or not. The transparency measured by spectrophotometer is preferably 55% or more.

The present invention will be explained in detail with reference to Examples below.

DSC curve was measured by using differential scanning calorimeter (PERKIN-ELMER DSC7 type) according to JIS K7121.

The opening strength was determined by measuring the strongest strength (kgf) when the blocking seal portion was opened by adding pressure at the speed of 500mm/min using pulling test machine under the condition wherein the container, of which one compartment was filled with saline, was put between stainless plates and.

The peeling properties was determined by observing at sight the conditions of the blocking seal portions after the test of the opening test, and estimated according to the follows.

I ○. . . totally opened

Δ. . . partially opened x . . . not opened (more than 100 kgf)

The transparency was determined by using spectrophotometer (U-3300 type, manufactured by Hitachi) as follows: distilled water was put into a reference cell and a measure cell; a sample (a strip having a size of 9 mm×40 mm) was put into the measure cell; and the transparency at a wave length of 450 nm was measured.

In addition, the following resin materials are also used: LLDPE polymerized by using a single site catalyst (density: 0. 923 g/c,m , MFR: 2.7 g/10 min (according to JIS K 7210, at a temperature of[[1]90° C. and a loading of 2.16 kgf, the followings are same)) (hereinbelow referred to as LL–1); LLDPE (density: 0.920 g/cm$^3$ MFR: 2.0 g/10 min) (hereinbelow referred to as LL–2); LLDPE manufactured by Idemitsu Oil Chemical (trade name: moretech 3500Z) (hereinbelow referred to as LL-A); LDPE manufactured by Japan polyolefin (trade name: J-rex F22) (hereinbelow referred to as LD); HDPE manufactured by Japan polyolefin (trade name: J-rex F5030ME) (hereinbelow referred to as HD); and random polypropylene manufactured by Japan polyolefin (trade name: J-aromer PM921Y) (hereinbelow referred to as PP).

The DSC curves of the above resins were measured. The results are shown in Table 1. The DSC curve of LL–1 is shown in FIG. 2.

TABLE 1

| Resins | Tpm (° C.) | h1 (mW) | h2 (mW) | h2/h1 |
|---|---|---|---|---|
| LL-1 | 123.5 | 20.78 | 4.4 | 0.21 |
| LL-2 | 124.0 | 12.66 | 2.71 | 0.21 |
| LL-A | 120.4 | 6.17 | 3.22 | 0.52 |
| LD | 109 | 10.6 | — | — |
| HD | 134.6 | 25.52 | 2.05 | 0.08 |
| PP | 150 | 7.66 | 0.73 | 0.095 |

EXAMPLES 1 to 6

Cylinder films, which have a thickness of 250 μm and a width in a folded state of 210 mm, were prepared from the above resins using inflation film molding machine. The resulting films were cut into a size of 360 mm, and the centers thereof were heat sealed by heat plates having a width of 10 mm to make blocking seal portion. The sealing was performed so that the opening strength before sterilizing became 20 to 50 kgf as follows: a temperature of seal bars was set to 105 to 125° C.; pressure of seal bars was set to 0.3 to 0.5 MPa; and the time of the sealing was controlled. Then, the both ends were heat sealed together with open members in a usual manner to make plural-compartment medical containers.

One of the compartments was filled with 800 ml of Japanese Pharmacopeia saline and sealed. Next, the sterilizing treatment was carried out for 30 minutes at a temperature of 115° C. using hydrothermal high-pressure steam sterilizing apparatus (manufactured by Nippan Seisakusho). After the sterilizing treatment, the conditioning was carried out for 24 hours at a temperature of 23° C., followed by the estimations of opening strength, peeling properties, and transparency. The result is shown in Table 2.

Regarding Example 4, the following estimation was impossible to do since the container was broken in the sterilizing treatment.

TABLE 2

| | Resins | Opening strengh (kgf) | Peeling properties | Transparency (%) |
|---|---|---|---|---|
| Example 1 | LL-1 | 51 | ○ | 62 |
| Example 2 | LL-2 | 49 | ○ | 64 |
| Example 3 | LL-A | 100 or more | x | 60 |
| Example 4 | LD | — | — | — |
| Example 5 | HD | 42 | ○ | 30 or less |
| Example 6 | PP | 9 | ○ | 75 |

Industrial Applicability

The plural-compartment medical container is capable of carrying plural drug solutions or infusion solutions in plural compartments without leaking and mixing before use, makes it possible to aseptically mix drug solutions at the time of use simply by pushing a pouch, and has excellent flexibility and transparency.

Accordingly, the plural-compartment medical containers of the present invention are suitably available for filling containers of infusion solutions (sugars, electrolyte formulations and amino acids formulations), drug solutions, and the like, which require aseptic mixing thereof.

What is claimed is:

1. A medical container comprising:

a pouch formed of a synthetic resin, wherein the pouch is divided into plural compartments in a liquid-tight manner by a peelable blocking seal portion, and an open member for filling or withdrawing a drug solution, located at at least one of upper and lower ends of the pouch, wherein the synthetic resin of said peelable blocking seal portion consists of polyethylene which has a melting temperature curve, determined using a differential scanning calorimeter, such that a height ratio (h2/h1) between a height (h1) of a peak which appears at a temperature of a main melting peak, and a height (h2) of said temperature curve at a temperature of 115° C., is within a range of 0.05 to 0.4.

2. A medical container according to claim 1 characterized in that the temperature of main melting peak of the resin of the blocking seal portion is within a range of 120 to 135° C.

3. A medical container according to claim 1 or claim 2, wherein the pouch is made from a single layer film.

4. A medical container according to claim 1 or 2, characterized in that each compartment is filled with a different infusion solution, sealed, and treated at a sterilizing temperature of 115° C. or more.

5. A medical container according to claim 3, characterized in that each compartment is filled with a different infusion solution, sealed, and treated at a sterilizing temperature of 115° C. or more.

* * * * *